(12) United States Patent
Harada et al.

(10) Patent No.: US 12,414,007 B2
(45) Date of Patent: Sep. 9, 2025

(54) TERMINAL, RADIO COMMUNICATION METHOD, BASE STATION, AND SYSTEM FOR CARRYING OUT A RANDOM ACCESS PROCEDURE

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/198,804

(22) Filed: Mar. 11, 2021

(65) Prior Publication Data
US 2021/0204328 A1 Jul. 1, 2021

Related U.S. Application Data

(63) Continuation of application No. 16/347,750, filed as application No. PCT/JP2017/040201 on Nov. 8, 2017, now abandoned.

(30) Foreign Application Priority Data

Nov. 9, 2016 (JP) ................................ 2016-219019

(51) Int. Cl.
H04W 74/0833 (2024.01)
H04W 28/04 (2009.01)
(Continued)

(52) U.S. Cl.
CPC ....... *H04W 74/0833* (2013.01); *H04W 28/04* (2013.01); *H04W 72/12* (2013.01);
(Continued)

(58) Field of Classification Search
CPC . H04W 74/0833; H04W 28/04; H04W 72/12; H04W 72/1289; H04W 72/14;
(Continued)

(56) References Cited

U.S. PATENT DOCUMENTS

| 8,295,210 B2 | 10/2012 | Iwamura et al. |
| 9,877,290 B2 * | 1/2018 | Aiba .................. H04W 52/325 |

(Continued)

FOREIGN PATENT DOCUMENTS

| EP | 2 900 026 A1 | 7/2015 |
| JP | 2013-526088 A | 6/2013 |

(Continued)

OTHER PUBLICATIONS

Office Action in counterpart Indian Patent Application No. 201917017629 issued on Sep. 7, 2021 (6 pages).

(Continued)

*Primary Examiner* — Ivan O Latorre
(74) *Attorney, Agent, or Firm* — Osha Bergman Watanabe & Burton LLP

(57) ABSTRACT

In one aspect, a terminal includes a receiver that receives system information including configuration information, which is first information, regarding a Physical Uplink Control Channel (PUCCH), and receives a downlink control information including second information regarding the PUCCH, the downlink control information being for at least one of a message in response to a random access preamble and a contention resolution message in a random access procedure. The terminal also includes a processor that controls a transmission of uplink control information based on the configuration information regarding the PUCCH and the second information regarding the PUCCH. The configuration information regarding the PUCCH is configured commonly with the terminal and other terminals, and the second information regarding the PUCCH is configured individually for the terminal and not configured with the other terminals. In other aspects, a radio communication method, a base station, and a system are also disclosed.

5 Claims, 13 Drawing Sheets

(51) Int. Cl.
  *H04W 72/12* (2023.01)
  *H04W 72/23* (2023.01)
  *H04W 74/02* (2009.01)
  *H04W 74/08* (2024.01)

(52) U.S. Cl.
  CPC .......... *H04W 72/23* (2023.01); *H04W 74/02* (2013.01); *H04W 74/08* (2013.01)

(58) Field of Classification Search
  CPC ... H04W 74/02; H04W 74/08; H04W 74/004; H04W 74/006
  See application file for complete search history.

(56) References Cited

U.S. PATENT DOCUMENTS

| | | | | |
|---|---|---|---|---|
| 10,306,630 | B2* | 5/2019 | Yin | H04L 1/1812 |
| 2012/0057449 | A1* | 3/2012 | Takaoka | H04B 1/713 |
| | | | | 375/E1.033 |
| 2013/0034073 | A1* | 2/2013 | Aiba | H04W 52/325 |
| | | | | 370/329 |
| 2015/0055618 | A1 | 2/2015 | Takaoka et al. | |
| 2015/0222395 | A1* | 8/2015 | Suzuki | H04L 1/1812 |
| | | | | 370/329 |
| 2016/0150462 | A1* | 5/2016 | Yang | H04W 74/0833 |
| | | | | 370/254 |
| 2016/0150507 | A1 | 5/2016 | Kim et al. | |
| 2016/0295609 | A1 | 10/2016 | Vajapeyam et al. | |
| 2017/0303241 | A1 | 10/2017 | Yang et al. | |
| 2018/0116000 | A1* | 4/2018 | Ly | H04W 74/006 |
| 2018/0205513 | A1* | 7/2018 | Yamamoto | H04L 5/0007 |
| 2019/0045345 | A1 | 2/2019 | Lee et al. | |

FOREIGN PATENT DOCUMENTS

| | | |
|---|---|---|
| JP | 2016-523498 A | 8/2016 |
| WO | 2008/096627 A1 | 8/2008 |
| WO | 2010/137341 A1 | 12/2010 |

OTHER PUBLICATIONS

Office Action in counterpart Australian Patent Application No. 2017359491 issued on Aug. 24, 2021 (8 pages).
Intel Corporation; "Remaining aspects of PUCCH for MTC"; 3GPP TSG RAN WG1 Meeting #83, R1-156502; Anaheim, USA; Nov. 16-20, 2015 (5 pages).
CATT; "PUCCH resource allocation and frequency hopping for Rel-13 MTC UEs"; 3GPP TSG RAN WG1 Meeting #82bis, R1-155171; Malmö, Sweden; Oct. 5-9, 2015 (4 pages).
Office Action issued in the counterpart European Patent Application No. 17868683.8, mailed on May 3, 2021 (6 pages).
International Search Report issued in PCT/JP2017/040201 mailed on Jan. 30, 2018 (1 page).
Written Opinion of the International Searching Authority issued in PCT/JP2017/040201 mailed on Jan. 30, 2018 (5 pages).
Ericsson; "Msg3/Msg4 transmission for MTC"; 3GPP TSG RAN WG1 Meeting #82bis, R1-155040; Malmö, Sweden; Oct. 5-9, 2015 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).
Extended European Search Report issued in counterpart European Patent Application No. 17868683.8, mailed on May 18, 2020 (7 pages).
CATT.; "PUCCH resource allocation and frequency hopping for Rel-13 MTC UEs"; 3GPP TSG RAN WG1 Meeting #82, R1-153904; Beijing, China; Aug. 24-28, 2015 (4 pages).
MediaTek Inc.; "PUCCH resource determination for Rel-13 MTC"; 3GPP TSG-RAN WG1 Meeting #83, R1-157382; Anaheim, USA; Nov. 15-22, 2015 (3 pages).
Office Action issued in the counterpart Japanese Patent Application No. 2018-550220, mailed on Jun. 8, 2021 (8 pages).
Extended European Search Report issued in European Application No. 22151341.9 mailed on Apr. 25, 2022 (8 pages).
Office Action in counterpart Australian Patent Application No. 2017359491 issued on Jun. 21, 2022 (3 pages).
Office Action issued in Chinese Application No. 201780081986.1 mailed on Aug. 26, 2022 (16 pages).
Intel Corporation; "DL gaps and remaining details of timing relationships for NB-IoT"; 3GPP TSG RAN WG1 Meeting #84bis, R1-162973; Busan, South Korea; Apr. 11-15, 2016 (7 pages).
3GPP TS 36.331 V14.0.0; "3rd Generation Partnership Project; Technical Specification Group Radio Access Network; Evolved Universal Terrestrial Radio Access (E-UTRA); Radio Resource Control (RRC); Protocol specification (Release 14)"; Sep. 2016 (643 pages).
Office Action issued in counterpart Japanese Patent Application No. 2021-196696 mailed on Dec. 27, 2022 (6 pages).
Office Action issued in the counterpart Japanese Patent Application No. 2021-196696, mailed on May 9, 2023 (6 pages).
Extended European Search Report issued in counterpart European Application No. 24183351.6 mailed on Sep. 12, 2024 (7 pages).

* cited by examiner

TERMINAL, RADIO COMMUNICATION METHOD, BASE STATION, AND SYSTEM FOR CARRYING OUT A RANDOM ACCESS PROCEDURE

CROSS-REFERENCE TO RELATED APPLICATIONS

The present application is a continuation application and, thereby, claims benefit under 35 U.S.C. § 120 to U.S. application Ser. No. 16/347,750, filed on May 6, 2019, titled "USER TERMINAL AND RADIO COMMUNICATION METHOD," which is a U.S. National Stage Application of PCT Application No. PCT/JP2017/040201, filed on Nov. 8, 2017, which claims priority to Japanese Patent Application No. 2016-219019, filed on Nov. 9, 2016. The contents of the priority applications are incorporated by reference in their entirety.

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified. Successor systems of LTE (e.g., Future Radio Access (FRA), the 5th generation mobile communication system (5G), New Radio (NR), New radio access (NX), and Future generation radio access (FX) that is also referred to as LTE Rel. 13, 14, 15 or subsequent releases) have been also studied.

LTE Rel. 10/11 have introduced Carrier Aggregation (CA) that aggregates a plurality of component carriers (CC) to obtain a wider band. Each CC is composed by a system band of LTE Rel. 8 as one unit. Furthermore, according to CA, a plurality of CCs of the same radio base station (eNB: eNodeB) are configured to a user terminal (UE: User Equipment).

On the other hand, LTE Rel. 12 has introduced Dual Connectivity (DC), too, that configures a plurality of Cell Groups (CG) of different radio base stations to UEs. Each cell group includes at least one cell (CC). DC aggregates a plurality of CCs of the different radio base stations. Therefore, DC is also referred to as inter-base station CA (Inter-eNB CA).

Furthermore, in existing LTE systems (e.g., LTE Rel. 8 to 13), a user terminal can transmit UL data when UL synchronization is established between a radio base station and the user terminal. Hence, the existing LTE systems support a random access procedure (RACH procedure: Random Access Channel Procedure) for establishing UL synchronization.

According to the random access procedure, the user terminal obtains information (Timing Advance (TA)) related to a transmission timing on UL according to a response (random access response) from a radio base station to a randomly selected preamble (random access preamble), and establishes UL synchronization based on the TA.

After the UL synchronization is established, the user terminal receives Downlink Control Information (DCI) (UL grant) from the radio base station, and then transmits UL data by using UL resources allocated by the UL grant.

CITATION LIST

Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (e.g., 5G and NR) are requested to accommodate various types of service such as high-speed and large-volume communication (eMBB: enhanced Mobile Broad Band), massive connection (massive MTC) from Internet of Things (IoT) devices or Machine-to-Machine communication (M2M) devices such as Machine Type Communication (MTC), or low-latency and ultra-reliable communication (URLLC: Ultra-reliable and Low Latency Communication) in a single framework.

Thus, the future radio communication systems are assumed to include a plurality of services having different requests for latency reduction in a mixed manner. Hence, the future radio communication systems are demanded to accommodate a plurality of user terminals of different numerologies (that are also referred to as multiple numerologies). In this regard, the numerology refers to a communication parameter (e.g., at least one of a subcarrier interval, a bandwidth, a symbol length, a Cyclic Prefix (CP) length, a TTI length, the number of symbols per TTI, a radio frame configuration, filtering processing and windowing processing) in both or one of a frequency direction and a time direction.

Furthermore, the future radio communication systems are assumed to support a flexible transmission/reception bandwidth according to capability of a user terminal (UE capability). Hence, there might be also a probability that the future radio communication systems have a different design principal of a control channel on uplink and/or downlink from those of the existing LTE systems. For example, it is thought that a configuration of an uplink control channel used to transmit uplink control information is configured differently.

Furthermore, it is thought that a communication procedure (e.g., random access procedure) used by the existing LTE systems is applied to the future radio communication systems, too. However, how to control the random access procedure in the future radio communication systems is a problem.

The present invention has been made in light of this problem. One of objects of the present invention to provide a user terminal and a radio communication method that can suitably carry out a random access procedure in future radio communication systems.

Solution to Problem

A user terminal according to one aspect of the present invention is a user terminal that uses a random access procedure, and includes: a reception section that receives a contention resolution message during a random access; and a control section that controls transmission of a transmission acknowledgement signal for the contention resolution message, and the control section performs control to transmit the transmission acknowledgement signal by using a resource of a predetermined uplink control channel based on at least a response signal for the random access or configuration information of an uplink control channel included in the contention resolution message.

Advantageous Effects of Invention

According to the present invention, it is possible to suitably carry out a random access procedure in future radio communication systems.

DESCRIPTION OF EMBODIMENTS

Existing LTE systems (e.g., LTE Rel. 8 to 13) support a random access procedure for establishing UL synchronization. The random access procedure includes a Contention-Based Random Access (CBRA), and a Non-Contention-Based Random Access (Non-CBRA that is also referred to as Contention-Free Random Access (CFRA)).

According to the Contention-Based Random Access (CBRA), a user terminal transmits a preamble selected at random from a plurality of preambles (also referred to as a random access preamble, a random access channel (PRACH: Physical Random Access Channel), and an RACH preamble)) determined for each cell. Furthermore, the contention-based random access is a random access procedure led by the user terminal, and can be used at, for example, a time of an initial access, or start or resumption of UL transmission.

On the other hand, according to the Non-Contention-Based Random Access (Non-CBRA or CFRA: Contention-Free Random Access), a radio base station allocates a preamble specifically to the user terminal on a DownLink (DL) control channel (PDCCH: Physical Downlink Control Channel) or an EPDCCH: Enhanced PDCCH), and the user terminal transmits the preamble allocated from the radio base station. The non-contention-based random access is a random access procedure led by a network, and can be used at, for example, a time of handover, or start or resumption of DL transmission (start or resumption of transmission of DL retransmission instruction information on UL).

Figure 1:
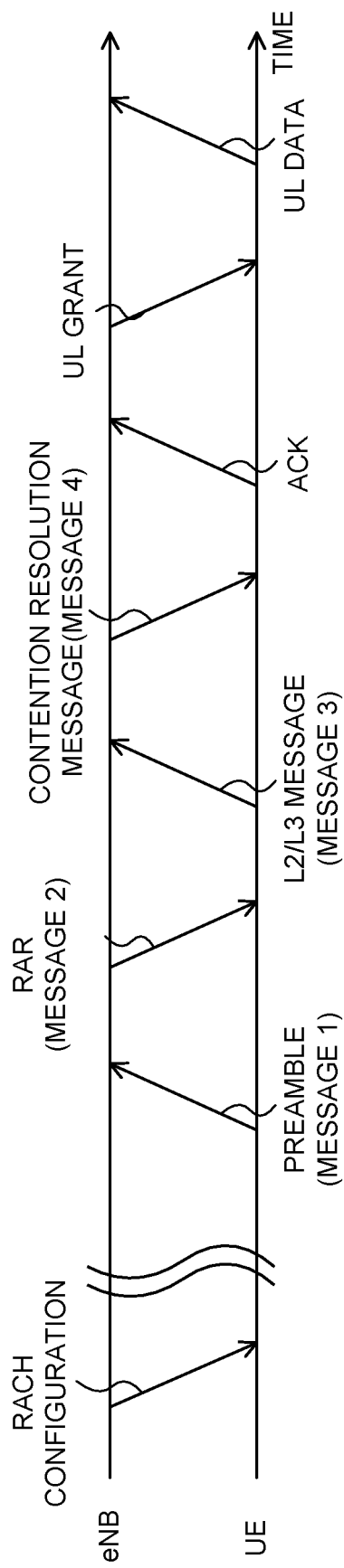
FIG. 1 is a diagram illustrating one example of a contention-based random access procedure.

FIG. 1 is a diagram illustrating one example of a contention-based random access. In FIG. 1, the user terminal receives information (PRACH configuration information) indicating a random access channel (PRACH) configuration (a PRACH configuration or an RACH configuration) in advance by system information (e.g., a Master Information Block (MIB) and/or a System Information Block (SIB)) or higher layer signaling (e.g., Radio Resource Control (RRC) signaling).

The PRACH configuration information can indicate, for example, a plurality of preambles (e.g., preamble format) determined for each cell, and a time resource (e.g., a system frame number and a subframe number) and a frequency resource (e.g., an offset (prach-FrequencyOffset) indicating a start position of six resource blocks (PRB: Physical Resource Blocks)) used to transmit the PRACH.

As illustrated in FIG. 1, when an idle (RRC_IDLE) state transitions to an RRC connected (RRC_CONNECTED) state (e.g., at a time of initial access) or when UL synchronization is not established in the RRC connected state (e.g., at a time of start or resumption of UL transmission), the user terminal selects one of a plurality of preambles indicated by the PRACH configuration information at random, and transmits the selected preamble on the PRACH (message 1).

When detecting the preamble, the radio base station transmits a Random Access Response (RAR) as a response to the detection (message 2). When failing receiving the RAR within a predetermined period (RAR window) after transmitting the preamble, the user terminal increases PRACH transmission power and transmits (retransmits) the preamble again. In addition, increasing transmission power during retransmission is also referred to as power ramping.

The user terminal that has received the RAR adjusts a UL transmission timing based on a timing advance (TA) included in the RAR, and establishes UL synchronization. Furthermore, the user terminal transmits a control message of a higher layer (L2/L3: Layer 2/Layer 3) by using a UL resource indicated by a UL grant included in the RAR (message 3). The control message includes an identifier (UE-ID) of the user terminal. The identifier of the user terminal may be, for example, a UE-ID of a higher layer such as a Cell-Radio Network Temporary Identifier (C-RNTI) in the RRC connected state or a System Architecture Evolution-Temporary Mobile Subscriber Identity (S-TMSI) in the idle state.

The radio base station transmits a contention resolution message according to a control message of the higher layer (message 4). The contention resolution message is transmitted addressed to the identifier of the user terminal included in the above control message. The user terminal that has succeeded detecting the contention resolution message transmits an acknowledgement response (ACK: Acknowledgement) of Hybrid Automatic Repeat request (HARQ) to the radio base station. Thus, the user terminal in the idle state transitions to the RRC connected state.

On the other hand, the user terminal that has failed detecting the contention resolution message decides that contention has occurred, selects a preamble again and repeats the random access procedure of the messages 1 to 4. When detecting that the contention has been resolved by ACK from the user terminal, the radio base station transmits a UL grant to the user terminal. The user terminal transmits UL data by using the UL resource allocated by the UL grant.

Furthermore, the existing LTE systems apply HARQ subsequently to the message 3. For example, the user terminal determines a PUCCH resource based on uplink control channel resource information commonly notified to the user terminals by system information, and a Control Channel Element (CCE) index included in the downlink control channel (PDCCH).

According to the above contention-based random access, when desiring transmission of UL data, the user terminal can start the random access procedure autonomously. Furthermore, after UL synchronization is established, UL data is transmitted by using the UL resource allocated specifically to the user terminal by the UL grant, so that it is possible to perform reliable UL transmission.

According to 5G and/or NR (5G/NR), too, it is considered to use a random access preamble similar to the existing LTE systems. In this regard, when a transmission/reception method (e.g., HARQ) of the existing LTE systems is applied as is to the random access procedure of 5G/NR, there is a risk that the random access procedure cannot be appropriately performed. A problem of a case where the method of the existing LTE systems is applied to the random access procedure of 5G/NR (e.g., a case where an uplink control channel is used) will be described below.

Future radio communication systems (e.g., 5G and NR) are expected to realize various radio communication services while satisfying respectively different request conditions (e.g., an ultra-high speed, a large volume and ultra low latency). Hence, it is considered for the future radio communication systems to introduce time units (e.g., a frame, a subframe, a slot, a mini slot, a subslot or a Transmission Time Interval (TTI)) of different configurations from those of the existing LTE systems (prior to LTE Rel. 13). For example, the subframe is a time unit of a predetermined time duration (e.g., 1 ms) irrespectively of the numerology.

The slot is a time unit based on the numerology (e.g., a subcarrier interval and/or the symbol length) and the number of symbols. When, for example, the subcarrier interval is 15 kHz or 30 kHz, the number of symbols per slot may be seven or 14 symbols. On the other hand, when the subcarrier interval is 60 kHz or more, the number of symbols per slot may be 14 symbols. Furthermore, the slot may include a plurality of mini (sub) slots.

It is considered for the future radio communication systems to support flexible transmission and/or reception bandwidths according to capability of the user terminal (UE capability). In this case, the transmission and/or reception bandwidths are configured to each user terminal to control communication. That is, 5G/NR assume that a design principle of a downlink control channel and/or an uplink control channel is defined differently from those of the existing LTE systems.

For example, the existing LTE systems transmit downlink control channels (or downlink control information) by using an entire system bandwidth. By contrast with this, it is considered for 5G/NR to configure a predetermined frequency domain and control transmission of the downlink control information without necessarily allocating downlink control information for a certain UE to the entire system band and transmitting the downlink control information. The predetermined frequency domain configured to the UE is also referred to as a control subband.

Furthermore, the existing LTE systems transmit uplink control channels (or uplink control information) by using both ends of a system band. By contrast with this, it is considered for 5G/NR to perform communication by using a configuration where a channel used for DL transmission and a channel used for UL transmission are arranged in a certain time unit (e.g., slot). The channel used for DL transmission corresponds to a downlink control channel and/or a downlink data channel, and the channel used for UL transmission corresponds to an uplink control channel and/or an uplink data channel.

Figure 2:
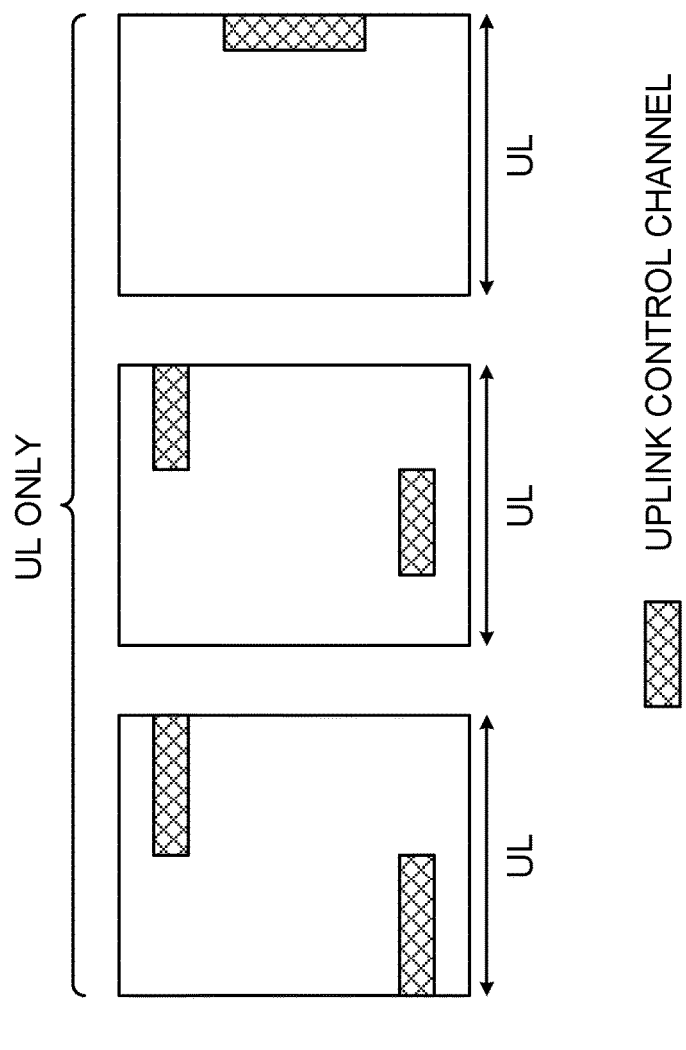
FIG. 2 is a diagram illustrating one example of an uplink control channel configuration and/or resources.
Figure 2:
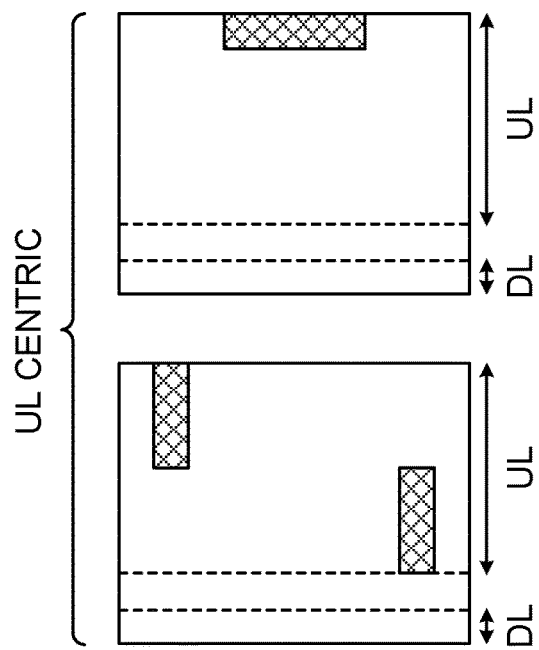

FIG. 2 illustrates one example of a configuration of an uplink control channel configured in a predetermined time unit (also referred to as, for example, a frame, a subframe, a slot, a mini slot or a subslot) used by future radio communication systems. In FIG. 2, a slot on which a UL data channel is arranged is mainly used for UL communication, and therefore may be referred to as a UL centric slot. Furthermore, it is also possible to configure a time interval (UL-only) in which only UL transmission is performed. In addition, although not illustrated in FIG. 2, there is also considered a configuration where an uplink control channel is arranged in a slot (also referred to as a DL centric slot) on which a DL data channel is arranged.

As illustrated in FIG. 2, as a time domain to which the uplink control channel is allocated, there are considered a configuration where the uplink control channel is arranged in one symbol at a tail (or one symbol to several symbols at the tail) of a slot, a configuration where the uplink control channel is arranged on all slots, and a configuration where the uplink control channel is arranged in a domain except several symbols at a head (e.g., a downlink control channel and a gap period). Furthermore, there is considered a configuration where the uplink control channel is allocated to one or a plurality of domains in a slot.

Thus, to support a plurality of uplink control channel configurations, it is necessary to determine which uplink control channel configuration and/or resources the user terminal uses to transmit uplink control information (e.g., HARQ-ACK). When, for example, the transmission acknowledgement signal (also referred to as HARQ-ACK or A/N) for the message 4 is transmitted by using the uplink control channel in the random access procedure, a problem is how to determine the uplink control channel configuration and/or resources to be applied.

When the user terminal establishes RRC connection (RRC Connected), the radio base station can notify each user terminal of information related to the uplink control channel configuration and/or the resources by using RRC signaling. Consequently, the user terminal can select an appropriate uplink control channel configuration and/or resources.

On the other hand, when the radio base station and the user terminal are not RRC-connected (e.g., when the user terminal makes an initial access or when the idle state transitions to the RRC connected state), the radio base station cannot notify the user terminal of the information by using RRC signaling. In this case, similar to the existing LTE systems, it is considered to apply a method for determining resources of the uplink control channel based on a Control Channel Element (CCE) index for configuring a downlink control channel. In this regard, as described above, according to 5G/NR, there is a risk that it is difficult to flexibly support a case where there are user terminals of different operating bandwidths, and/or a new uplink control channel configuration.

Hence, the inventors have focused on that it is possible to use DL transmission supported before the message 4 of the random access procedure even before the RRC connected state, and notify the user terminal of information (also referred to as the uplink control channel configuration and/or resource information) related to the uplink control channel by using at least the message 2 or the message 4.

The present embodiment will be described in detail below. In addition, in the following description, the message 2 can be used as a response signal for a random access preamble from a base station, and the message 4 can be used as a setup information broadcast signal for RRC connection.

First Embodiment

According to the first embodiment, an uplink control channel (e.g., PUCCH) configured to a transmission acknowledgement signal corresponding to a message 4 is included in the message 4, and is notified to a user terminal. The configuration information of the uplink control channel may be information used to transmit an uplink control channel, and is also referred to as uplink control channel configuration information and/or resource information.

A radio base station includes the configuration information of the uplink control channel in the message 4 (e.g., downlink control information (DL grant)) to notify each user terminal. In this case, the radio base station can notify each user terminal of UE specific uplink control channel configuration information. When feeding back the transmission acknowledgement signal (HARQ-ACK) for the message 4, the user terminal can determine the uplink control channel configuration and/or the resources based on the uplink control channel configuration information notified from the radio base station.

The user terminal performs control to transmit the transmission acknowledgement signal for the message 4 at a predetermined timing. The predetermining timing may be configured to come after a timing (e.g., 4 ms after the message 4 is received) of existing LTE systems. Consequently, it is possible to secure a certain period of time to some degree until the uplink control channel configuration and/or the resources indicated by the uplink control channel configuration information are determined after the uplink control channel configuration information included in the message 4 is received, so that it is possible to reduce a processing load of the user terminal.

The predetermined timing may be defined in advance by the specification, or may be notified by using a message 2 and/or system information in advance from the radio base station to the user terminal.

Furthermore, when the user terminal decides that the transmission acknowledgement signal for the received message 4 is NACK, it is highly probable that the uplink control channel configuration information included in the message 4 cannot be completely received. Hence, the user terminal may perform control not to transmit the transmission acknowledgement signal when the transmission acknowledgement signal for the message 4 is NACK. Consequently, the user terminal can avoid transmitting the transmission acknowledgement signal by using a wrong uplink control channel configuration and/or resources. As a result, it is possible to prevent contention with an uplink control channel of another user terminal.

The radio base station waits for feedback of the transmission acknowledgement signal from the user terminal that has transmitted the message 4 in a predetermined period. Furthermore, when the radio base station cannot detect ACK fed back from the user terminal, the radio base station decides that transmission of the message 4 is NACK (the user terminal has made a mistake of detection of the message 4), and transmits (retransmits) the message 4 again.

Figure 3:
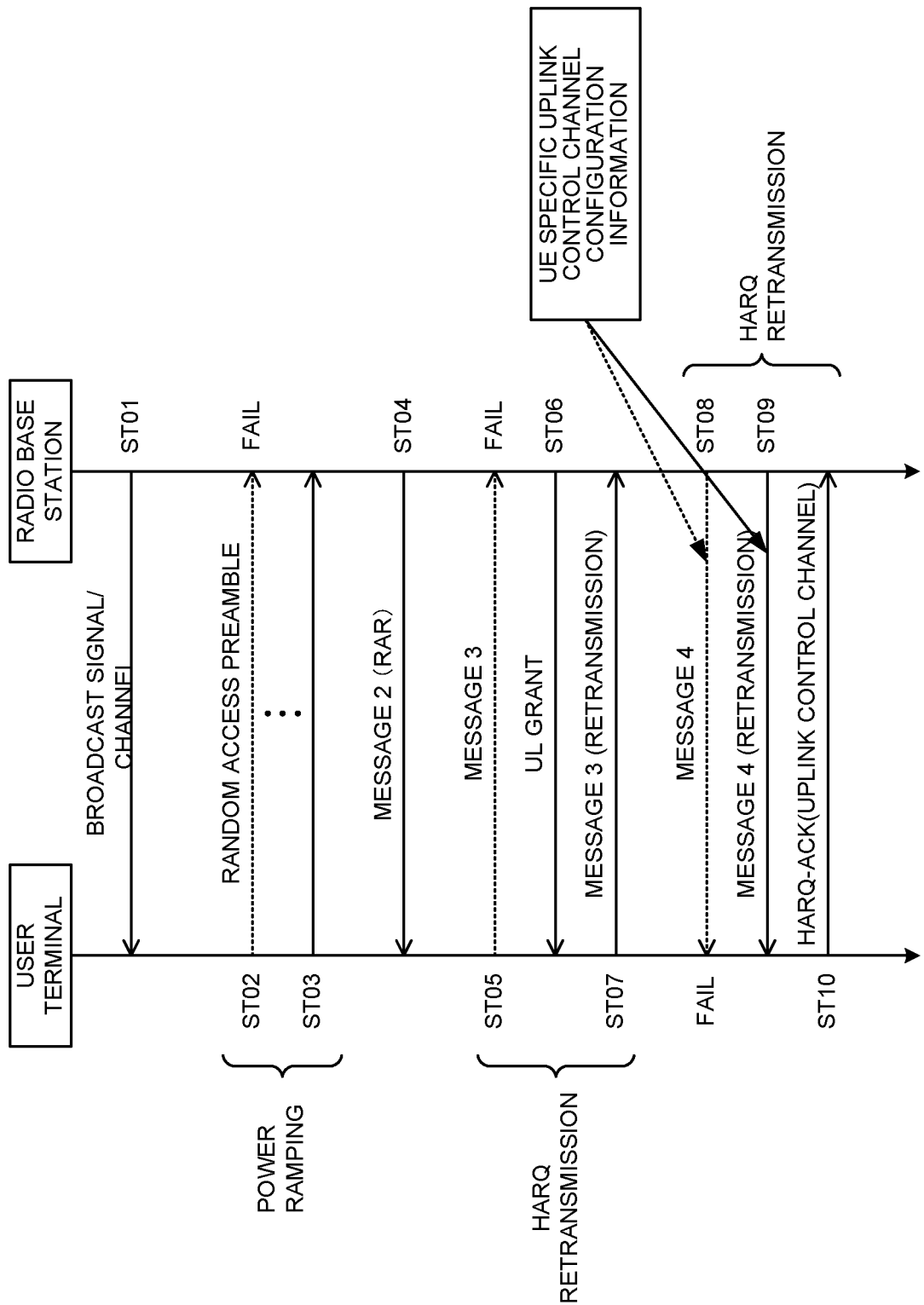
FIG. 3 is a diagram illustrating one example of a communication method including a random access procedure according to a first embodiment.

FIG. 3 illustrates one example of a radio communication method including a random access procedure according to the first embodiment. First, the user terminal receives a broadcast signal and/or a broadcast channel (system information) transmitted from the radio base station (ST01). The system information includes a Master Information Block (MIB) and/or a System Information Block (SIB).

The user terminal obtains information indicating a PRACH configuration based on the system information, selects a predetermined preamble, and transmits a random access preamble (PRACH) (ST02). Furthermore, when the user terminal does not succeed receiving an RAR within a predetermined (RAR window) after transmitting the PRACH (when, for example, the user terminal fails receiving the RAR), the user terminal increases PRACH transmission power and retransmits the PRACH (ST03). Increasing the transmission power at a time of retransmission of the PRACH is also referred to as power ramping.

When detecting the PRACH transmitted from the user terminal, the radio base station transmits a random access response (an RAR that is also referred to as a message 2) as a response to the detection (ST04).

The user terminal that has received the RAR adjusts a UL transmission timing based on a timing advance (TA) included in the RAR, and establishes UL synchronization. Furthermore, the user terminal transmits a control message (message 3) of a higher layer (L2/L3: Layer 2/Layer 3) by using an uplink data channel (e.g., PUSCH) by a UL resource indicated by a UL grant included in the RAR (ST05).

The user terminal includes an identifier of the user terminal (UE-ID) in the message 3 to notify the radio base station. The identifier of the user terminal may be, for example, the UE-ID of the higher layer such as a Cell-Radio Network Temporary Identifier (C-RNTI) in an RRC connected state, and a System Architecture Evolution-Temporary Mobile Subscriber Identity (S-TMSI) in an idle state.

Furthermore, the user terminal may include information related to the operating bandwidth (a bandwidth to support) of the user terminal in the message 3 to transmit to the radio base station. Consequently, the radio base station that has received the message 3 can flexibly determine the uplink control channel configuration and/or the resources configured to the user terminal.

When the radio base station cannot appropriately receive the message 3 transmitted from the user terminal, the radio base station transmits a UL grant for instructing transmission of the message 3 to the user terminal again (ST06). The user terminal that has received the UL grant for retransmission of the message 3 retransmits the message 3 (ST07).

The radio base station transmits a contention resolution message (message 4) according to the message 3 transmitted from the user terminal (ST08). The message 4 can be transmitted addressed to the identifier of the user terminal included in the above message 3. Furthermore, the radio base station includes in the message 4 (e.g., in a DL grant) the configuration information of the uplink control channel used by the user terminal to transmit the transmission acknowledgement signal for the message 4 to notify the user terminal.

The radio base station waits for the transmission acknowledgement signal fed back from the user terminal that has received the message 4 within a range of a predetermined period. When the radio base station cannot detect ACK transmitted from the user terminal within the range of the predetermined period, the radio base station decides that the user terminal has made a mistake of detection of the message 4 (NACK), and retransmits the message 4 (ST09). Furthermore, the radio base station can include the configuration information of the uplink control channel used by each user terminal in the message 4, too that is retransmitted, too, to notify the user terminal.

In addition, the configuration information of the uplink control channel included in the message 4 that is transmitted first to the user terminal, and the configuration information of the uplink control channel included in the message 4 to be retransmitted may have the same contents or may have different contents. When transmission of different contents by the message 4 is enabled, it is possible to flexibly control the uplink control channel configured to each user terminal.

The user terminal that has appropriately received the message 4 feeds back ACK by using the uplink control channel configuration and/or the resources indicated by the uplink control channel configuration information included in the message 4 (ST10). Thus, by controlling transmission of the uplink control channel based on the uplink control channel configuration information included in the message 4, the user terminal can select an appropriate uplink control channel configuration and/or resources even when there are pluralities of uplink control channel configurations and/or resources supported by communication.

Furthermore, when deciding that the transmission acknowledgement signal for the received message 4 is NACK, the user terminal performs control not to transmit the transmission acknowledgement signal (NACK). Consequently, it is possible to prevent a problem that the user terminal transmits a transmission acknowledgment signal by using a wrong uplink control channel configuration and/or resources, and causes contention with an uplink control channel of another user terminal.

Second Embodiment

According to the second embodiment, configuration information of an uplink control channel configured to a transmission acknowledgement signal for a message 4 is included in a message 2 and is notified to a user terminal. The configuration information of the uplink control channel may be information used to transmit the uplink control channel, and is also referred to as uplink control channel configuration information and/or resource information.

A radio base station includes the configuration information of the uplink control channel in the message 2 (e.g., in downlink control information (UL grant)) to notify each user terminal. In this case, the radio base station can notify each user terminal of individual uplink control channel configuration information of each user terminal. When feeding back a transmission acknowledgement signal (HARQ-ACK) for the message 4, the user terminal can determine an uplink control channel configuration and/or resources based on the uplink control channel configuration information notified from the radio base station.

The user terminal performs control to transmit the transmission acknowledgement signal for the message 4 at a predetermined timing. The predetermined timing may be defined in advance by a specification or may be notified from the radio base station to the user terminal by using the message 2 and/or system information.

For example, the predetermined timing may be configured similar to timings (e.g., 4 ms after the message 4 is received) of existing LTE systems. When the uplink control information is obtained by the message 2, it is possible to secure a long processing time of the user terminal by a timing for transmitting the transmission acknowledgement signal for the message 4 compared to a case where the uplink control channel information is obtained by the message 4. Consequently, even when the predetermined timing is configured similar to the timings of the existing LTE systems, it is possible to suppress an increase in a processing load of the user terminal.

Furthermore, even in a case where the user terminal has decided that the transmission acknowledgement signal for the message 4 is NACK, it is highly probable that the user terminal can appropriately receive the uplink control channel configuration information included in the message 2. Hence, when the transmission acknowledgement signal for the message 4 is NACK, the user terminal may feed back NACK to the radio base station by using a predetermined uplink control channel similar to ACK. Consequently, even when the user terminal fails receiving the message 4, the radio base station can make decision based on the notification from the user terminal.

The radio base station may use part of resource information (allocation field) for the message 3 as uplink control channel configuration information (e.g., resource information) in a UL grant included in an RAR (message 2). That is, the radio base station may use part of a bit field of the UL grant indicating the resource (e.g., uplink data channel) used to transmit the message 3 to indicate the resource of the transmission acknowledgement signal for the message 4. Consequently, it is possible to suppress an increase in bits accompanying the configuration of the uplink control channel configuration information.

In this case, the user terminal decides the uplink control channel configuration and/or the resources based on a predetermined bit field included in the UL grant of the message 2. Furthermore, when the radio base station transmits the UL grant for instructing retransmission of the message 3 to the user terminal, the user terminal controls transmission of the uplink control channel by using information included in the latest UL grant (by updating the uplink control channel configuration information).

Figure 4:
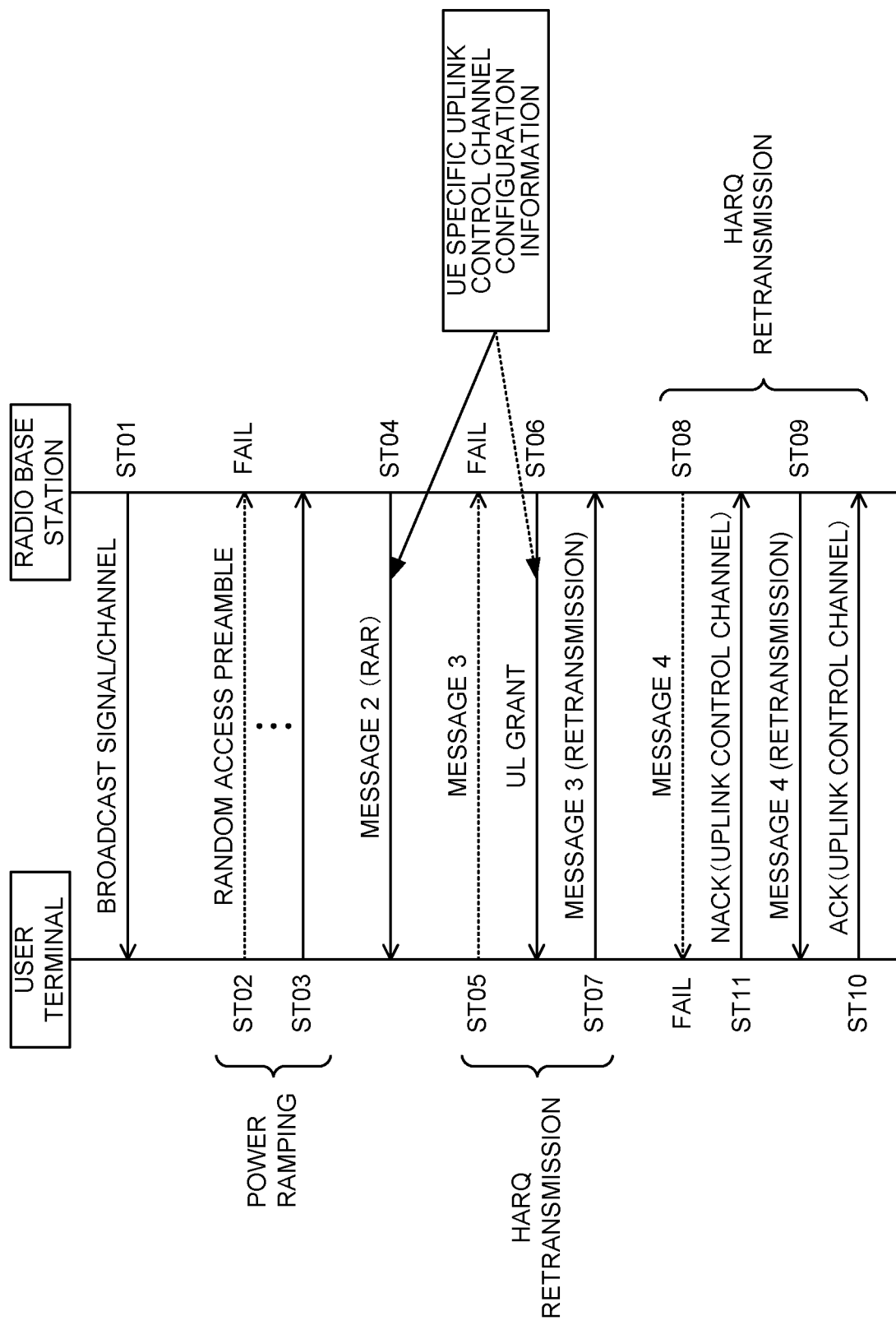
FIG. 4 is a diagram illustrating one example of a communication method including a random access procedure according to a second embodiment.

FIG. 4 illustrates one example of a radio communication method including a random access procedure according to the second embodiment. In addition, description of the same points as those of the first embodiment will be omitted.

First, the user terminal receives a broadcast signal and/or a broadcast channel transmitted from the radio base station (ST01). Next, the user terminal selects the predetermined preamble, and transmits a PRACH (ST02). Furthermore, when not succeeding receiving the RAR within the predetermined period after transmitting the PRACH, the user terminal increases PRACH transmission power and retransmits the PRACH (ST03). ST01 to ST03 can be performed similar to the above first embodiment.

When detecting the PRACH transmitted from the user terminal, the radio base station transmits a random access response (the RAR that is also referred to as the message 2) as a response to the detection (ST04). The radio base station includes in the message 2 the configuration information of the uplink control channel used by the user terminal to transmit the transmission acknowledgement signal for the message 4 to notify the user terminal. In addition, the configuration information of the uplink control channel may use part of resource information indicating transmission of the message 3 in the existing LTE systems.

The user terminal that has received the RAR adjusts a UL transmission timing based on a timing advance (TA) included in the RAR, and establishes UL synchronization. Furthermore, the user terminal transmits the message 3 by using the uplink data channel (e.g., PUSCH) by a UL resource indicated by a UL grant included in the RAR (ST05).

When the radio base station cannot appropriately receive the message 3 transmitted from the user terminal, the radio base station transmits the UL grant for instructing transmission of the message 3 to the user terminal again (ST06). The user terminal that has received the UL grant for retransmission of the message 3 retransmits the message 3 (ST07). Furthermore, when the retransmitted UL grant includes the configuration information of the uplink control channel, the user terminal updates the configuration information of the uplink control channel to contents of the configuration information of the uplink control channel included in the most recently received UL grant.

The radio base station transmits the message 4 according to the message 3 transmitted from the user terminal (ST08). The message 4 can be transmitted addressed to an identifier of the user terminal included in the above message 3.

The user terminal transmits the transmission acknowledgement signal (ACK or NACK) to the radio base station according to a reception status of the message 4 (ST11). The user terminal feeds back the transmission acknowledgement signal by using the uplink control channel configuration and/or the resources indicated by the uplink control channel configuration information included in the message 2. ST11 indicates that the user terminal feeds back NACK in response to the message 4.

Even in a case where the user terminal has decided that the transmission acknowledgement signal for the message 4 is NACK, it is highly probable that the user terminal can appropriately receive the uplink control channel configuration information included in the message 2. Consequently, when the transmission acknowledgement signal for the message 4 is NACK, the user terminal can feed back NACK to the radio base station by using a predetermined uplink control channel similar to ACK.

When receiving NACK from the user terminal, the radio base station retransmits the message 4 based on this NACK (ST09).

The user terminal that has appropriately received the message 4 feeds back ACK by using the uplink control channel configuration and/or the resources indicated by the uplink control channel configuration information included in the message 2 (or the UL grant for retransmission) (ST10). Thus, by controlling transmission of the uplink control channel based on the uplink control channel configuration information included in the message 2, the user terminal can select an appropriate uplink control channel configuration and/or resources even when there are pluralities of uplink control channel configurations and/or resources supported by communication.

In addition, when retransmitting the message 4, the radio base station may include the configuration information of the uplink control channel in the message 4 to be retransmitted to notify the user terminal as described in the first embodiment. Consequently, it is possible to flexibly control the uplink control channel configuration and/or the resources.

Third Embodiment

According to the third embodiment, part of configuration information of an uplink control channel configured to a transmission acknowledgement signal corresponding to a message 4 is included in system information (e.g., SIB), and the rest of the configuration information of the uplink control channel is included in a message 2 and/or the message 4 to notify the user terminal.

A radio base station includes part of the configuration information of the uplink control channel (e.g., uplink control channel configuration information that is common between user terminals) in the system information to notify (broadcast to) a plurality of user terminals. Furthermore, the radio base station includes the other part of the configuration information of the uplink control channel (e.g., uplink control channel configuration information specific to a user terminal) in the message 2 and/or the message 4 to notify each user terminal. For example, PUCCH-ConfigCommon included in an SIB2 can be used as the system information.

That is, the uplink control channel configuration information is notified commonly to the user terminals in advance, and the uplink control channel configuration information specific to the user terminal is additionally notified by using the message 2 (e.g., in downlink control information (UL grant)) and/or the message 4 (e.g., in downlink control information (DL grant)). Consequently, it is possible to suppress an increase in an information amount (the number of bits) to be added to the message 2 and/or the message 4.

For example, the radio base station notifies a plurality of user terminals of pluralities of uplink control channel configuration and/or resource candidates by using system information (e.g., SIB). Subsequently, the radio base station includes in the message 2 and/or the message 4 information (bit value) indicating a predetermined candidate (index) from pluralities of uplink control channel configurations and/or resource candidates (indexes) configured to the user terminal to transmit.

Alternatively, the radio base station notifies a plurality of user terminals of the basic uplink control channel configuration and/or the resources (also referred to as a basic configuration or a default configuration) by using the system information (e.g., SIB). Subsequently, the radio base station includes in the message 2 and/or the message 4 an offset value for part or all of parameters of the uplink control channel configuration and/or the resources (default configuration) configured to the user terminal to transmit.

The user terminal determines the uplink control channel configuration and/or the resources used for transmission based on the uplink control channel configuration information notified by the system information and the additional uplink control channel configuration information (indication information) notified by the message 2 and/or the message 4.

<Use of System Information+Message 2>

Figure 5:
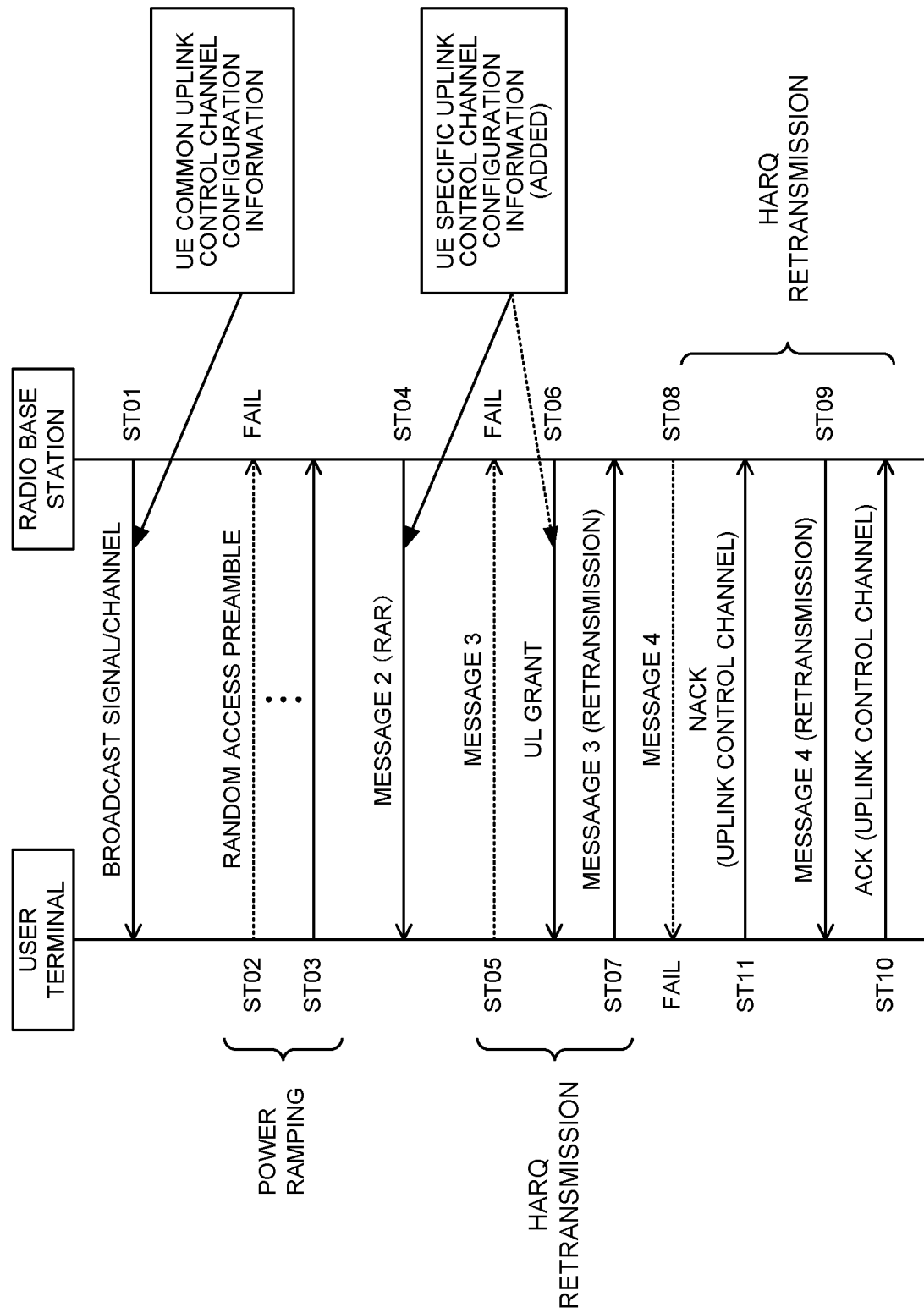
FIG. 5 is a diagram illustrating one example of a communication method including a random access procedure according to a third embodiment.

FIG. 5 illustrates one example of a radio communication method including a random access procedure according to the third embodiment. In addition, the same points as those of the above first embodiment or second embodiment will be omitted.

First, the user terminal receives a broadcast signal and/or a broadcast channel (system information) transmitted from the radio base station (ST01). The system information includes part of the configuration information of the uplink control channel (e.g., the uplink control channel configuration information that is common between the user terminals). For example, the user terminal obtains, from the system information, pluralities of uplink control channel configurations and/or resource candidates configured to a plurality of user terminals. Alternatively, the user terminal obtains from the system information the basic configuration (or the default configuration) of the uplink control channel configuration and/or the resources configured to a plurality of user terminals.

Next, the user terminal selects a predetermined preamble, and transmits a PRACH (ST02). Furthermore, when the user terminal does not succeed receiving an RAR within a predetermined period after transmitting the PRACH, the user terminal increases PRACH transmission power, and retransmits the PRACH (ST03).

When detecting the PRACH transmitted from the user terminal, the radio base station transmits a random access response (the RAR that is also referred to as the message 2) as a response to the detection (ST04). The radio base station can include in the message 2 part of the configuration information of the uplink control channel used by the user terminal to transmit the transmission acknowledgement signal for the message 4 to notify the user terminal.

The part of the uplink control channel configuration information can be information for specifying the uplink control channel configuration information notified by the system information per user (e.g., information indicating a predetermined candidate from a plurality of candidates or information for notifying an offset from the basic configuration). In addition, the part of the uplink control channel configuration information may use part of resource information indicating transmission of the message 3 in existing LTE systems.

The user terminal that has received the RAR adjusts a UL transmission timing based on a timing advance (TA) included in the RAR, and establishes UL synchronization. Furthermore, the user terminal transmits the message 3 by using an uplink data channel (e.g., PUSCH) by a UL resource indicated by a UL grant included in the RAR (ST05).

When the radio base station cannot appropriately receive the message 3 transmitted from the user terminal, the radio base station transmits the UL grant indicating transmission of the message 3 to the user terminal again (ST06). The user terminal that has received the UL grant for retransmission of the message 3 retransmits the message 3 (ST07). Furthermore, when the retransmitted UL grant includes part of the configuration information of the uplink control channel (e.g., indication information), the user terminal updates the configuration information of the uplink control channel to contents of the configuration information of the uplink control channel included in the most recently received UL grant.

The radio base station transmits the message 4 according to the message 3 transmitted from the user terminal (ST08).

The user terminal transmits the transmission acknowledgement signal (ACK or NACK) to the radio base station according to a reception status of the message 4 (ST11). The user terminal feeds back the transmission acknowledgement signal by using the uplink control channel configuration and/or the resources indicated by the uplink control channel configuration information included respectively in the system information and the message 2. ST11 indicates that the user terminal feeds back NACK in response to the message 4.

Even in a case where the user terminal has decided that the transmission acknowledgement signal for the message 4 is NACK, it is highly probable that the user terminal can appropriately receive the uplink control channel configuration information included in the system information and the message 2. Consequently, even when the transmission acknowledgement signal for the message 4 is NACK, the user terminal can feed back NACK to the radio base station by using the predetermined uplink control channel similar to ACK.

When receiving NACK from the user terminal, the radio base station retransmits the message 4 based on this NACK (ST09). The user terminal that has appropriately received the message 4 feeds back ACK by using the uplink control channel configuration and/or the resources indicated by the uplink control channel configuration information included in the system information and the message 2 (or a UL grant for retransmission). Thus, by controlling transmission of the uplink control channel based on the uplink control channel configuration information included in the system information and the message 2, the user terminal can select an appropriate uplink control channel configuration and/or resources even when there are pluralities of uplink control channel configurations and/or resources supported by communication.

In addition, when retransmitting the message 4, the radio base station may include the configuration information of the uplink control channel (additional information) in the message 4 to be retransmitted to notify the user terminal. Consequently, it is possible to flexibly control the uplink control channel configuration and/or the resources.

<Use of System Information+Message 4>

Figure 6:
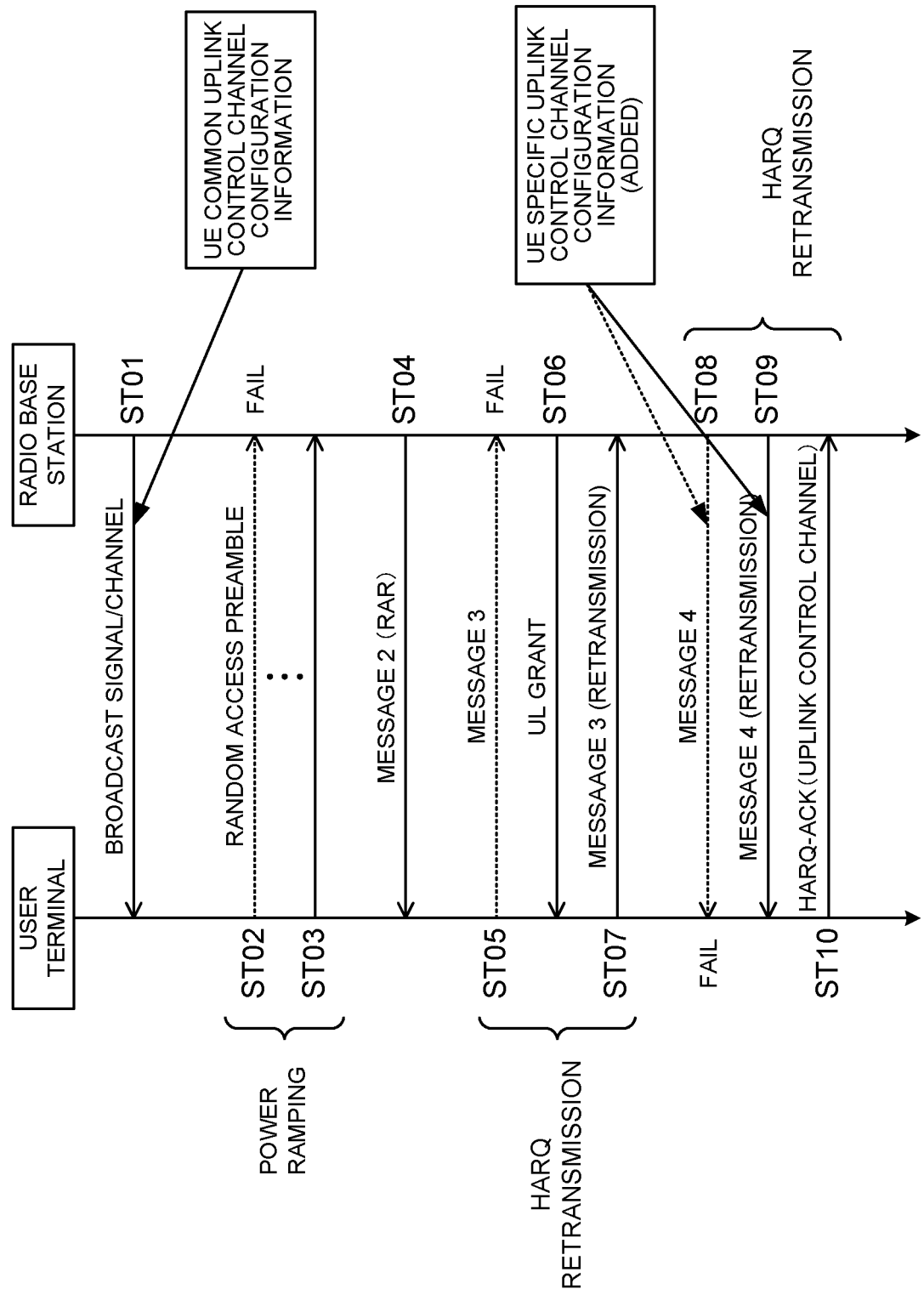
FIG. 6 is a diagram illustrating another example of the communication method including the random access procedure according to the third embodiment.

FIG. 6 illustrates another example of the radio communication method including the random access procedure according to the third embodiment. In addition, description of the same points as those of the above first embodiment or second embodiment will be omitted.

First, the user terminal receives a broadcast signal and/or a broadcast channel (system information) transmitted from the radio base station (ST01). The system information includes part of the configuration information of the uplink control channel (e.g., uplink control channel configuration information that is common between the user terminals). For example, the user terminal obtains, from the system information, pluralities of uplink control channel configurations and/or resource candidates configured to a plurality of user terminals. Alternatively, the user terminal obtains from the system information the basic configuration (or the default configuration) of the uplink control channel configuration and/or the resources configured to a plurality of user terminals.

Next, the user terminal selects a predetermined preamble, and transmits a PRACH (ST02). Furthermore, when the user terminal does not succeed receiving an RAR within a predetermined period after transmitting the PRACH, the user terminal increases PRACH transmission power, and retransmits the PRACH (ST03).

When detecting the PRACH transmitted from the user terminal, the radio base station transmits the message 2 as a response to the detection (ST04).

The user terminal that has received the RAR adjusts a UL transmission timing based on a timing advance (TA) included in the RAR, and establishes UL synchronization. Furthermore, the user terminal transmits the message 3 by using an uplink data channel (e.g., PUSCH) by a UL resource indicated by a UL grant included in the RAR (ST05).

In a case where the radio base station has not been able to appropriately receive the message 3 transmitted from the user terminal, the radio base station transmits the UL grant for instructing transmission of the message 3 to the user terminal again (ST06). The user terminal that has received the UL grant for retransmission of the message 3 retransmits the message 3 (ST07).

The radio base station transmits the message 4 according to the message 3 transmitted from the user terminal (ST08). Furthermore, the radio base station includes in the message 4 (e.g. in a DL grant) part of the configuration information of the uplink control channel used by the user terminal to transmit the transmission acknowledgement signal for the message 4 to notify the user terminal. The part of the uplink control channel configuration information can be information for specifying the uplink control channel configuration information notified by the system information per user (e.g., information indicating a predetermined candidate from a plurality of candidates or information for notifying an offset from the basic configuration).

The radio base station waits for the transmission acknowledgement signal fed back from the user terminal that has transmitted the message 4 within a range of a predetermined period. When the radio base station cannot detect ACK transmitted from the user terminal within the range of the predetermined period, the radio base station decides that the user terminal has made a mistake of detection of the message 4 (NACK), and retransmits the message 4 (ST09). Furthermore, the radio base station can include the configuration information of the uplink control channel used by each user terminal in the message 4, too, that is retransmitted to notify the user terminal.

In addition, part of the configuration information of the uplink control channel included in the message 4 transmitted first to the user terminal, and part of the configuration information of the uplink control channel included in the message 4 to be retransmitted may have the same contents, or may have different contents.

The user terminal that has appropriately received the message 4 feeds back ACK by using the uplink control channel configuration and/or the resources indicated by the uplink control channel configuration information included in the system information and the message 4 (ST10). Consequently, by controlling transmission of the uplink control channel based on the uplink control channel configuration information included in the system information and the message 4, the user terminal can select an appropriate uplink control channel configuration and/or resources even when there are pluralities of uplink control channel configurations and/or resources supported by communication.

Fourth Embodiment

The fourth embodiment will describe one example of uplink control channel configuration information (an uplink control channel configuration and/or resources). Although uplink control channels of UL centric and UL only will be described below, the present embodiment is applicable to an uplink control channel of DL centric, too.

Uplink control channel configuration information includes information related to whether or not frequency hopping of the uplink control channel is applied and/or an arrangement position. The information related to the arrangement position includes an RB index (an uplink control channel start position and/or the number of RBs to be arranged), and/or an arrangement position (e.g., an intra-slot start symbol index) in a time domain.

In addition, when the number of RBs to be arranged is determined in advance (e.g., one RB), and frequency hopping is applied, an RB hopping interval may be included in the uplink control channel configuration information instead of the number of RBs to be arranged.

Alternatively, the uplink control channel configuration information may include an index of a combination of a Cyclic Shift (CS) to be applied to the uplink control channel, and an orthogonal code. For example, a table that defines a plurality of combination candidates of the cyclic shift and the orthogonal code can be defined in advance, and information (index) indicating a predetermined candidate from a plurality of combination candidates can be included in the uplink control channel configuration information.

Alternatively, the uplink control channel configuration information may include information indicating a transmission timing (predetermined slot) of the uplink control channel from DL reception (e.g., a symbol from which the downlink control channel has been received), and/or the number of slots to use for transmission.

Figure 7:
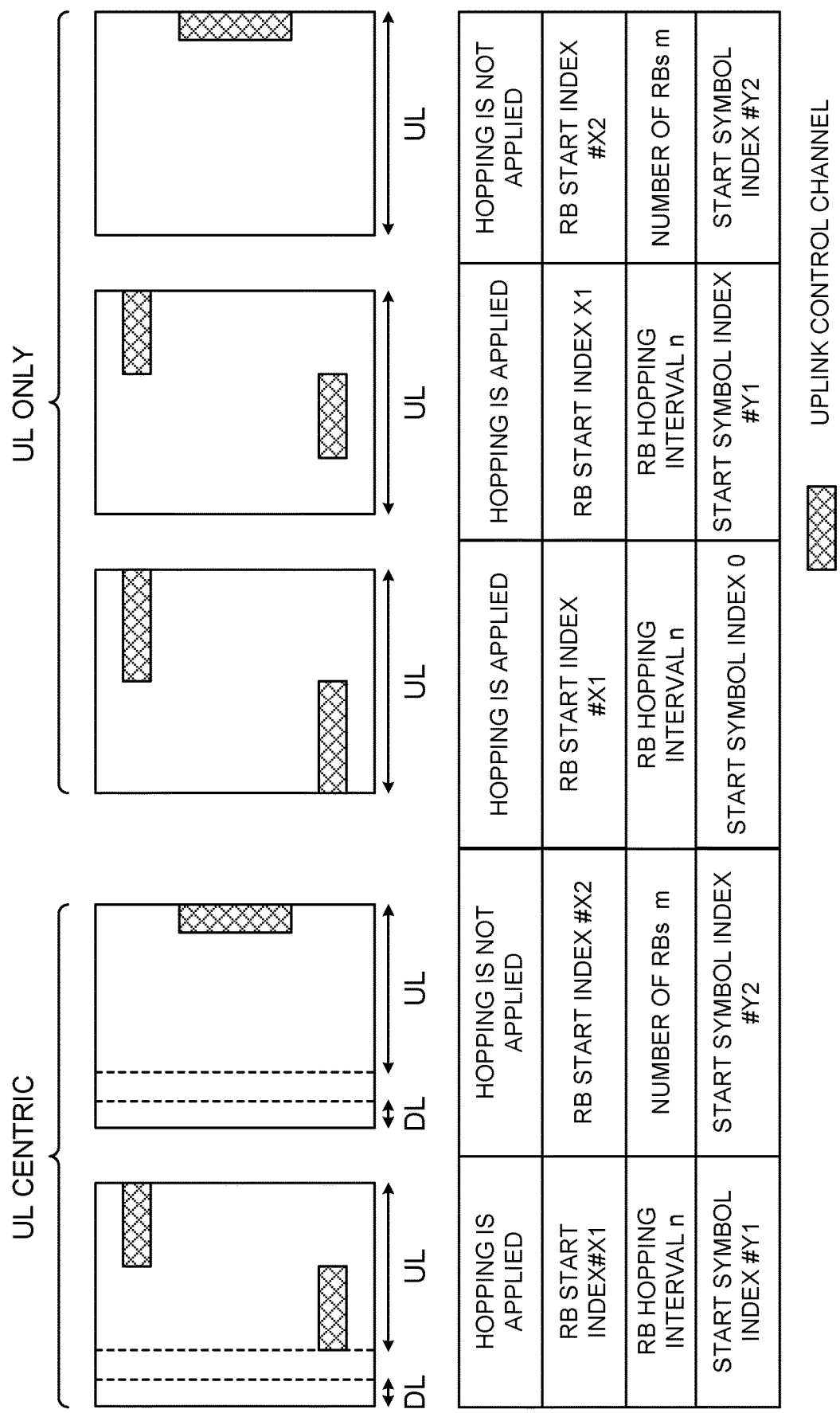
FIG. 7 is a diagram illustrating one example of contents of uplink control channel configuration information.

FIG. 7 illustrates that, as information for specifying pluralities of uplink control channel configurations and/or resources, whether or not frequency hopping is applied, an RB start index, an RB hopping interval (or the number of RBs) and a start symbol index are included in the uplink control channel configuration information. The radio base station notifies the user terminal of these parameters, and the user terminal specifies the uplink control channel configuration and/or the resources based on the notified parameters.

When frequency hopping is applied in FIG. 7, the RB hopping interval is included in the uplink control channel configuration information. When frequency hopping is not applied, the number of RBs used for the uplink control channel is included in the uplink control channel configuration information. In this case, the RB hopping interval and the number of RBs may be configured to the same bit field, and the user terminal side may read and decide a bit value of the bit field according to whether or not frequency hopping is applied. Consequently, when the uplink control channel configuration for applying frequency hopping and the uplink control channel configuration for not applying frequency hopping are supported, it is possible to suppress an increase in the information amount (bits) included in the uplink control channel configuration information.

In addition, the configuration information of the uplink control channel is not limited to the example illustrated in FIG. 7, and contents thereof can be optionally changed.

(Radio Communication System)

The configuration of the radio communication system according to one embodiment of the present invention will be described below. This radio communication system uses one or a combination of the radio communication methods according to the above embodiments of the present invention to perform communication.

Figure 8:
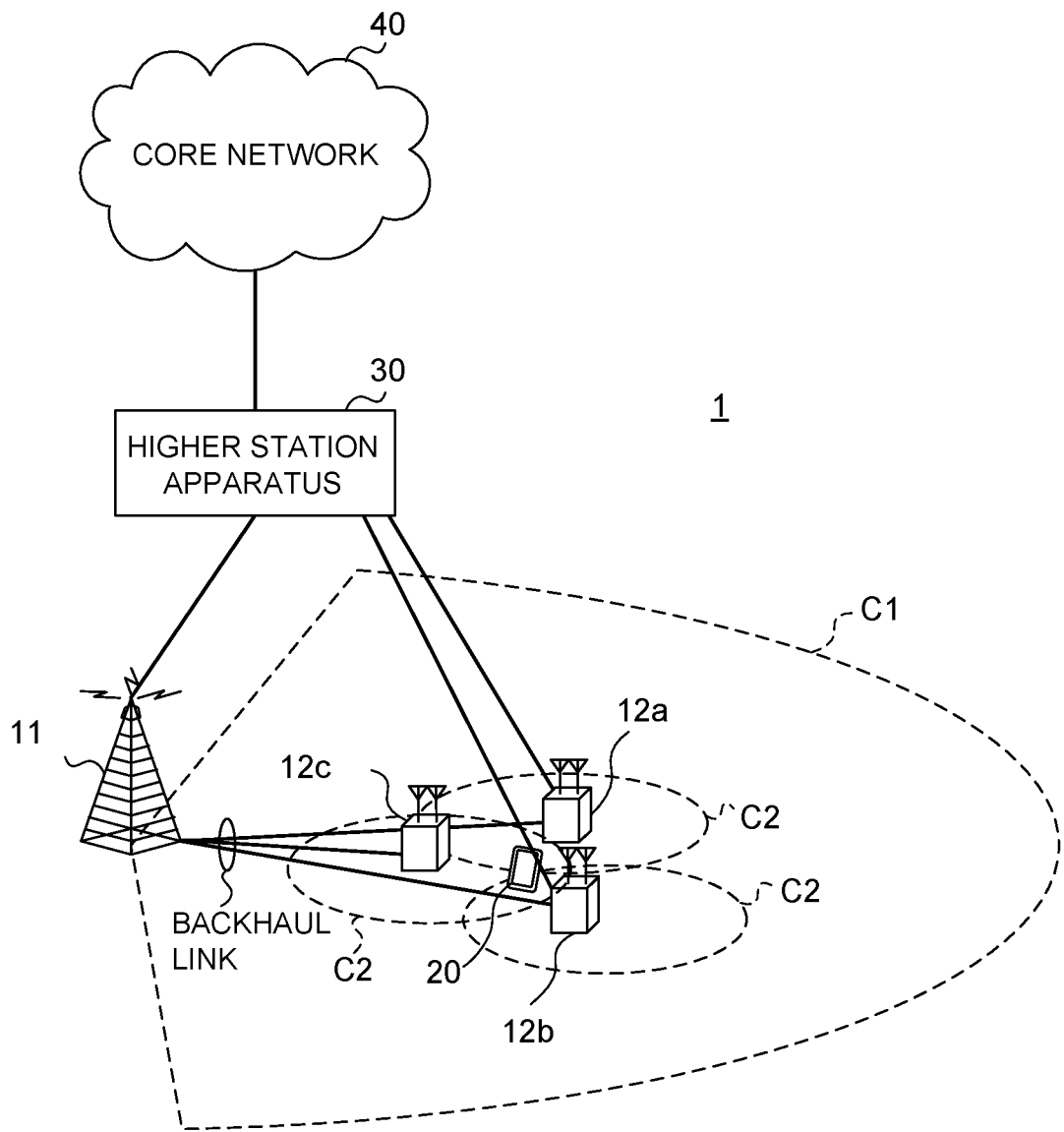
FIG. 8 is a diagram illustrating one example of a schematic configuration of a radio communication system according to one embodiment of the present invention.

FIG. 8 is a diagram illustrating one example of a schematic configuration of the radio communication system according to the one embodiment of the present invention. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and a New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (referred to as an existing carrier or a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz or 5 GHz) or may use the same carrier as that used by the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use different bands to reduce an interference between the terminals. In this regard, uplink and downlink radio access schemes are not limited to a combination of these and may be other radio access schemes.

The radio communication system 1 uses as downlink channels a downlink shared channel (PDSCH: Physical Downlink Shared Channel) shared by each user terminal 20, a broadcast channel (PBCH: Physical Broadcast Channel) and a downlink L1/L2 control channel. User data, higher layer control information and System Information Blocks (SIB) are transmitted on the PDSCH. Furthermore, Master Information Blocks (MIB) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as uplink channels an uplink shared channel (PUSCH: Physical Uplink Shared Channel) shared by each user terminal 20, an uplink control channel (PUCCH: Physical Uplink Control Channel), and a random access channel (PRACH: Physical Random Access Channel). User data and higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits as downlink reference signals a Cell-specific Reference Signal (CRS), a Channel State Information-Reference Signal (CSI-RS), a DeModulation Reference Signal (DMRS) and a Positioning Reference Signal (PRS). Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 9:
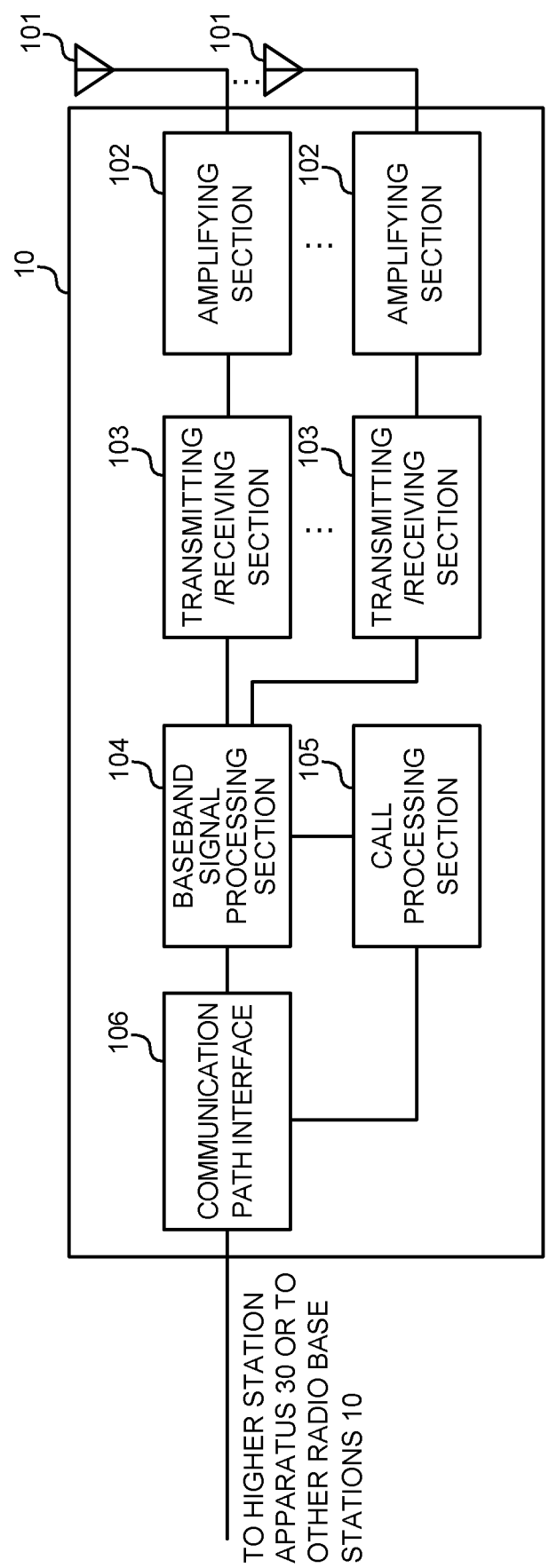
FIG. 9 is a diagram illustrating one example of an entire configuration of a radio base station according to the one embodiment of the present invention.

FIG. 9 is a diagram illustrating one example of an entire configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 transmits a broadcast signal and/or a broadcast channel (e.g., system information), an RAR (e.g., message 2) of a random access and a contention resolution message (e.g., message 4). Furthermore, each transmission/reception section 103 transmits configuration information of an uplink control channel. Furthermore, each transmission/reception section 103 receives a PRACH (message 1) of the random access and a message 3. Furthermore, each transmission/reception section 103 receives a transmission acknowledgement signal for the message 4.

Figure 10:
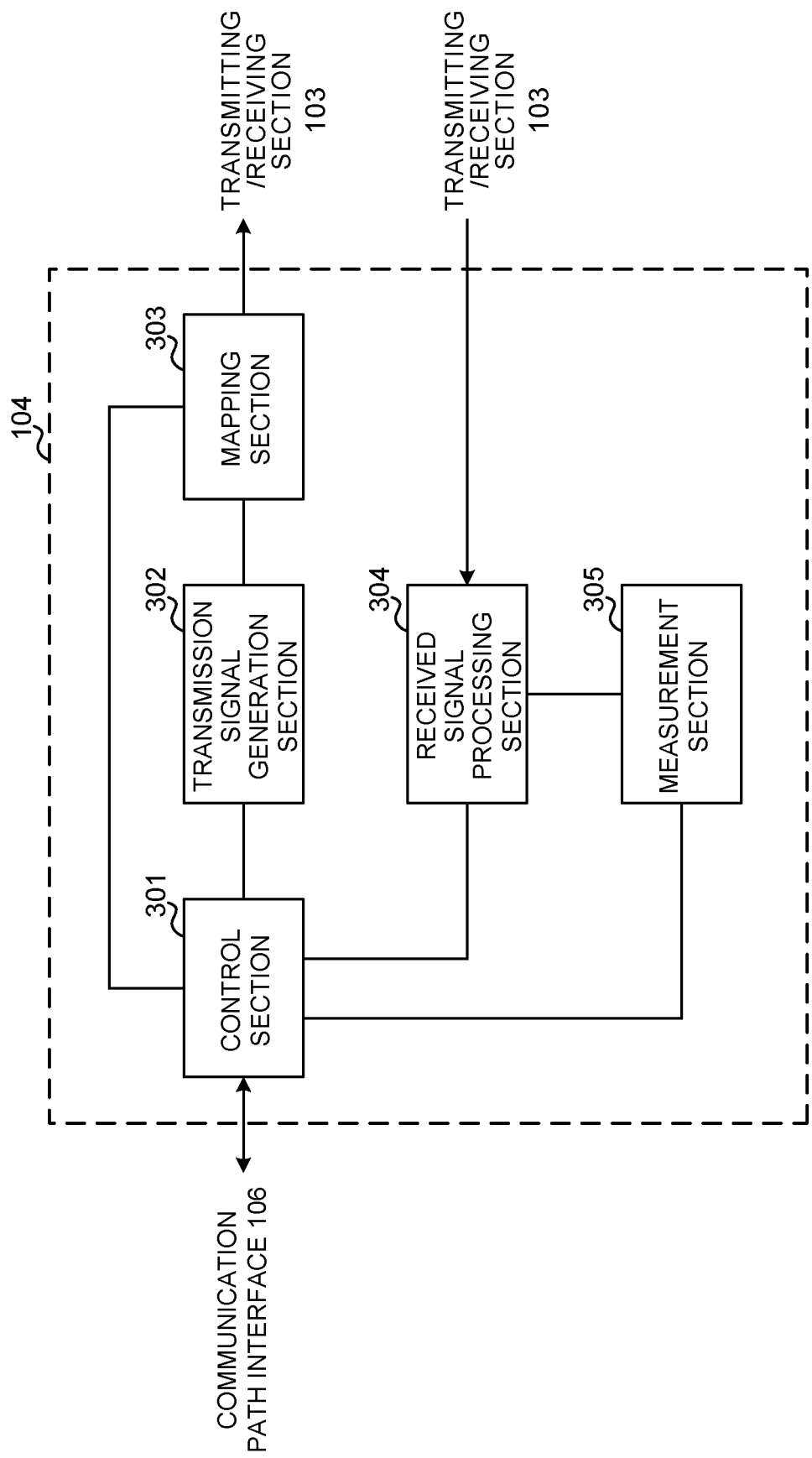
FIG. 10 is a diagram illustrating one example of a function configuration of the radio base station according to the one embodiment of the present invention.

FIG. 10 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components do not necessarily need to be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal transmitted on the PDSCH, and a downlink control signal transmitted on the PDCCH and/or the EPDCCH. Furthermore, the control section 301 controls generation of a downlink control signal (e.g., transmission acknowledgement information) and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals such as a CRS, a CSI-RS and a DMRS.

Furthermore, the control section 301 controls scheduling of an uplink data signal transmitted on the PUSCH, an uplink control signal (e.g., transmission acknowledgement information) transmitted on the PUCCH and/or the PUSCH, an RACH preamble transmitted on the PRACH and an uplink reference signal.

The control section 301 controls the random access procedure described in the above first embodiment to fourth embodiment. The control section 301 controls notification of configuration information of the uplink control channel used by the user terminal by, for example, using the message 2 or the message 4.

The transmission signal generating section 302 generates downlink signals (such as a downlink control signal, a downlink data signal and a downlink reference signal) based on an instruction from the control section 301, and outputs the downlink signals to the mapping section 303. The transmission signal generating section 302 can be composed of a signal generator, a signal generating circuit and a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a predetermined radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ)), a Signal to Interference plus Noise Ratio (SINR)) or a channel state of the received signal. The measurement section 305 may output a measurement result to the control section 301.

(User Terminal)

Figure 11:
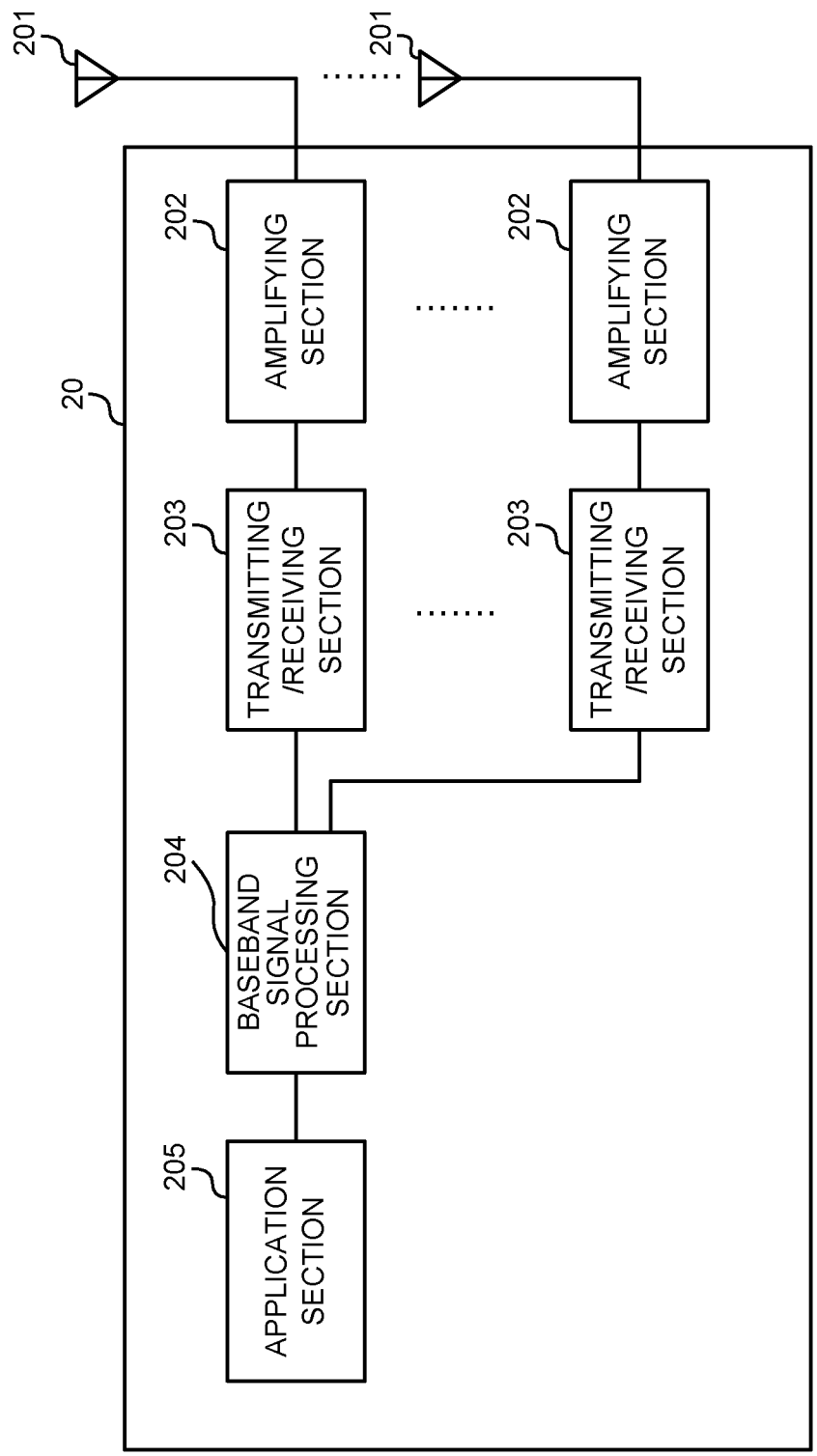
FIG. 11 is a diagram illustrating one example of an entire configuration of a user terminal according to the one embodiment of the present invention.

FIG. 11 is a diagram illustrating one example of an entire configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information among the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 transmits the PRACH (message 1) and the message 3 of a random access. Furthermore, each transmission/reception section 203 transmits the transmission acknowledgement signal for the message 4. Furthermore, each transmission/reception section 203 receives the broadcast signal and/or the broadcast channel (e.g., system information), an RAR (message 2) of the random access, and the message 4. Furthermore, each transmission/reception section 203 can receive the configuration information of the uplink control channel commonly configured to the user terminal by system information, and receive the configuration information of the uplink control channel individually configured to the user terminal by the message 2 or the message 4 (see FIG. 5).

Figure 12:
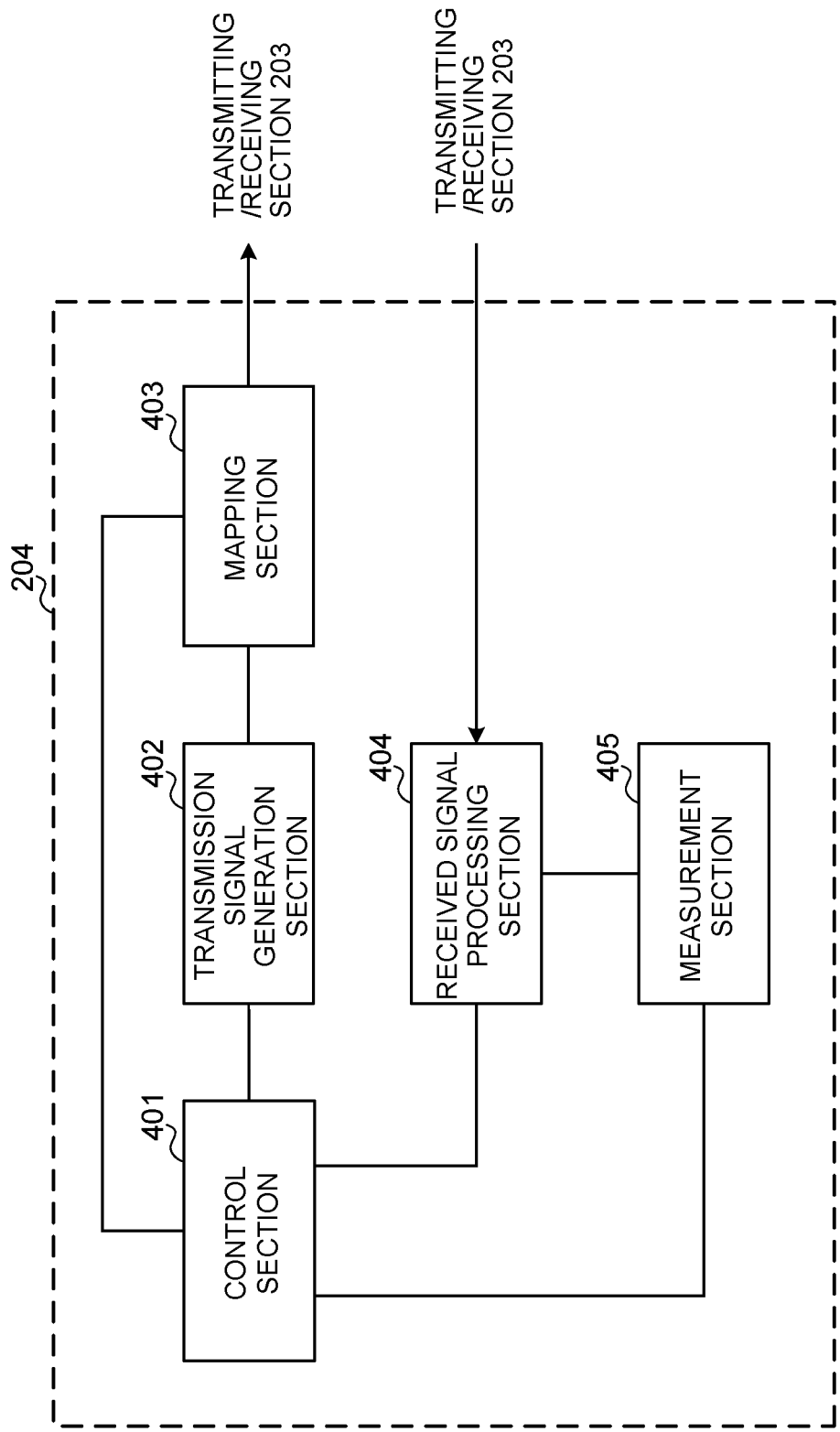
FIG. 12 is a diagram illustrating one example of a function configuration of the user terminal according to the one embodiment of the present invention.

FIG. 12 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, downlink control signals (signals transmitted on the PDCCH/EPDCCH) and a downlink data signal (a signal transmitted on the PDSCH) transmitted from the radio base station 10. The control section 401 controls generation of an uplink control signal (e.g., transmission acknowledgement information) and an uplink data signal based on a result obtained by deciding whether or not it is necessary to perform retransmission control on the downlink control signal and the downlink data signal.

The control section 401 controls transmission of the transmission acknowledgement signal for the contention resolution message (e.g., message 4). For example, the control section 401 performs control to transmit the transmission acknowledgement signal by using a predetermined uplink control channel resource based on at least a response signal (e.g., the message 2) for a random access preamble or the configuration information of the uplink control channel included in the message 4 (see FIGS. 3 and 4). Furthermore, when transmission of the configuration information of the uplink control channel is supported by the message 4, the control section 401 may perform control not to transmit the transmission acknowledgement signal in a case where the transmission acknowledgement signal is NACK.

Furthermore, when transmission of the configuration information of the uplink control channel is supported by the message 2, the control section 401 can control transmission of the transmission acknowledgement signal based on the configuration information of the uplink control channel configured to at least part of resource information of the UL grant included in the message 2. In addition, the configuration information of the uplink control channel can be configured to include information related to whether or not frequency hopping of the uplink control channel is applied and/or an allocation position (see FIG. 7).

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit and a signal generating apparatus described based on the common knowledge in the technical field according to the present invention.

For example, the transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) or a channel state of the received signal. The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (by way of, for example, wired connection or radio connection).

Figure 13:
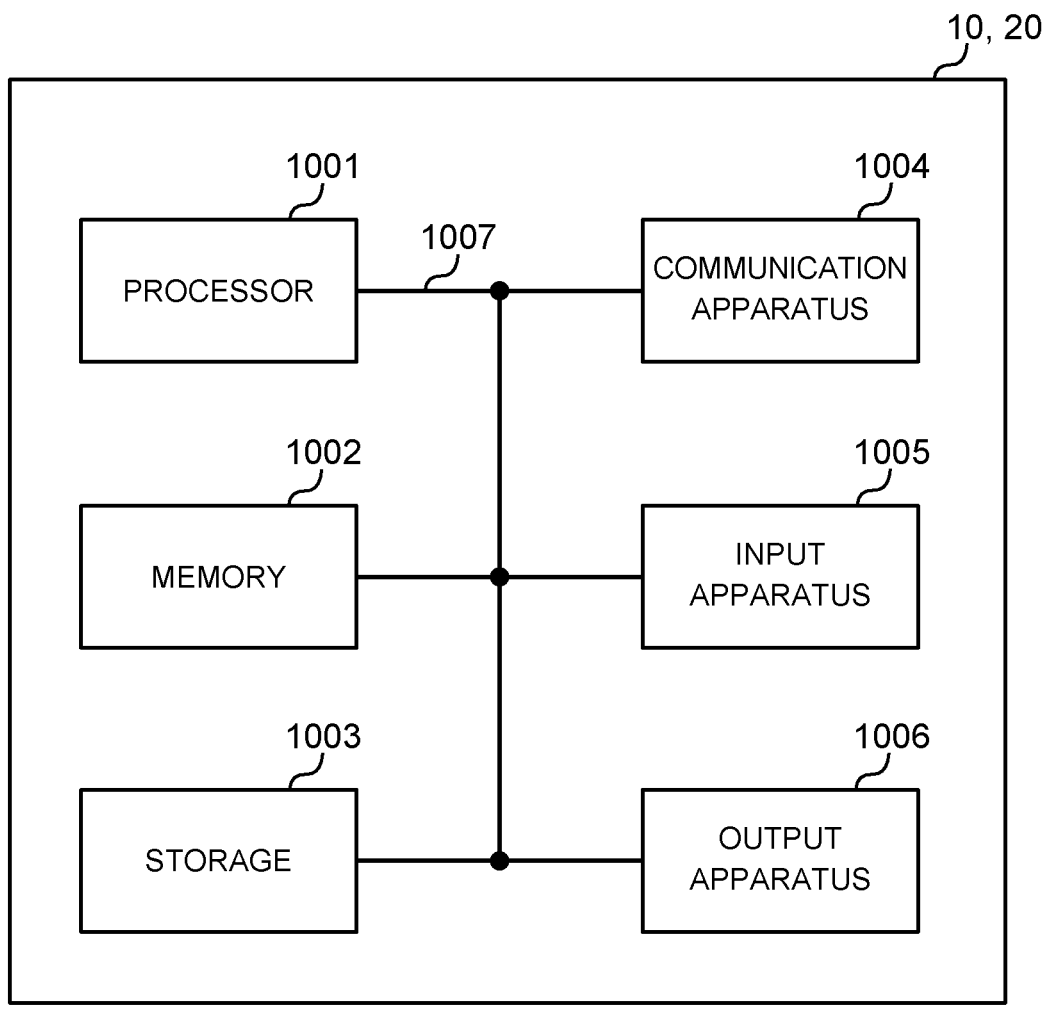
FIG. 13 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 13 is a diagram illustrating one example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an arithmetic operation, and control communication of the communication apparatus 1004 and reading and/or writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to the programs, the software module or the data. As the programs, programs that cause the computer to execute at least part of the operations described in the above embodiments are used. For example, the control section 401 of the user terminal 20 may be realized by a control program stored in the memory 1002 and operating on the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

MODIFIED EXAMPLE

In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., 1 ms) that does not depend on the numerology.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology. Furthermore, the slot may include a plurality of mini slots. Each mini slot may include one or a plurality of symbols in the time domain. Furthermore, the mini slot may be referred to as a subslot.

All of the radio frame, the subframe, the slot, the mini slot and the symbol indicate time units for transmitting signals. The other corresponding names of the radio frame, the subframe, the slot, the mini slot and the symbol may be used. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (1 ms) according to existing LTE, may be a period (e.g., 1 to 13 symbols) shorter than 1 ms or may be a period longer than 1 ms. In addition, a unit that represents the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a data packet (transport block) subjected to channel coding, a code block and/or a code word or may be a processing unit of scheduling or link adaptation. In addition, when the TTI is given, a time period (e.g., the number of symbols) in which a transport block, a code block and/or a code word are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource block allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRC Connection Setup message or an RRC Connection Reconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Furthermore, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A),LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description and the claims, these words intend to be comprehensive similar to the word "having". Furthermore, the word "or" used in this description and the claims intends not to be an exclusive OR.

The present invention has been described in detail above, yet it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

The invention claimed is:

1. A terminal comprising:
a receiver that receives system information including configuration information, which is first information, regarding a Physical Uplink Control Channel (PUCCH) resource set, and receives a downlink control information including second information regarding a PUCCH resource indicator, the downlink control information being for at least one of a message in response to a random access preamble and a contention resolution message in a random access procedure; and
a processor that controls, based on both the PUCCH resource set and the PUCCH resource indicator, an uplink control information transmission used for a HARQ-ACK information transmission,
wherein the configuration information regarding the PUCCH resource set is configured commonly with the terminal and other terminals, and the second information regarding the PUCCH resource indicator is configured individually for the terminal and not configured with the other terminals, and
the terminal receives the configuration information regarding the PUCCH resource set, indicating information regarding frequency hopping, information that indicates a cyclic shift index, and information that indicates a start symbol.

2. The terminal according to claim 1, wherein the downlink control information includes a timing of a delivery acknowledgement signal from a downlink shared channel.

3. A radio communication method for a terminal comprising:
receiving system information including configuration information, which is first information, regarding a Physical Uplink Control Channel (PUCCH) resource set;
receiving a downlink control information including second information regarding a PUCCH resource indicator, the downlink control information being for at least one of a message in response to a random access preamble and a contention resolution message in a random access procedure; and
controlling, based on both the PUCCH resource set and the PUCCH resource indicator, an uplink control information transmission used for a HARQ-ACK information transmission,
wherein the configuration information regarding the PUCCH resource set is configured commonly with the terminal and other terminals, and the second information regarding the PUCCH resource indicator is configured individually for the terminal and not configured with the other terminals, and
receiving the configuration information regarding the PUCCH resource set, indicating information regarding frequency hopping, information that indicates a cyclic shift index, and information that indicates a start symbol.

4. A base station comprising:
a transmitter that transmits system information including configuration information, which is first information, regarding a Physical Uplink Control Channel (PUCCH) resource set, and transmits a downlink control information including second information regarding a PUCCH resource indicator, the downlink control information being for at least one of a message in response to a random access preamble and a contention resolution message in a random access procedure; and
a processor that instructs a terminal to perform, based on both the PUCCH resource set and the PUCCH resource indicator, an uplink control information transmission used for a HARQ-ACK information transmission,
wherein the configuration information regarding the PUCCH resource set is configured commonly with the terminal and other terminals, and the second information regarding the PUCCH resource indicator is configured individually for the terminal and not configured with the other terminals, and
the base station transmits the configuration information regarding the PUCCH resource set, indicating information regarding frequency hopping, information that indicates a cyclic shift index, and information that indicates a start symbol.

5. A system comprising a base station and a terminal, wherein:
the base station comprises:
a transmitter that transmits system information including configuration information, which is first information, regarding a Physical Uplink Control Channel (PUCCH) resource set, and transmits the downlink control information including second information regarding a PUCCH resource indicator, the downlink control information being for at least one of a message in response to a random access preamble and a contention resolution message in a random access procedure; and
the terminal comprises:
a receiver that receives the system information including the configuration information, which is the first information, regarding the PUCCH resource set, and receives the downlink control information including the second information regarding the PUCCH resource indicator, the downlink control information being for at least one of the message in response to the random access preamble and the contention resolution message in the random access procedure; and
a processor that controls, based on both the PUCCH resource set and the PUCCH resource indicator, an uplink control information transmission used for a HARQ-ACK information transmission,
wherein the configuration information regarding the PUCCH resource set is configured commonly with the terminal and other terminals, and the second information regarding the PUCCH resource indicator is configured individually for the terminal and not configured with the other terminals, and
the terminal receives the configuration information regarding the PUCCH resource set, indicating information regarding frequency hopping, information that indicates a cyclic shift index, and information that indicates a start symbol.

\* \* \* \* \*